July 16, 1935.  C. C. FARMER  2,008,133
CHECK VALVE DEVICE
Filed May 25, 1932
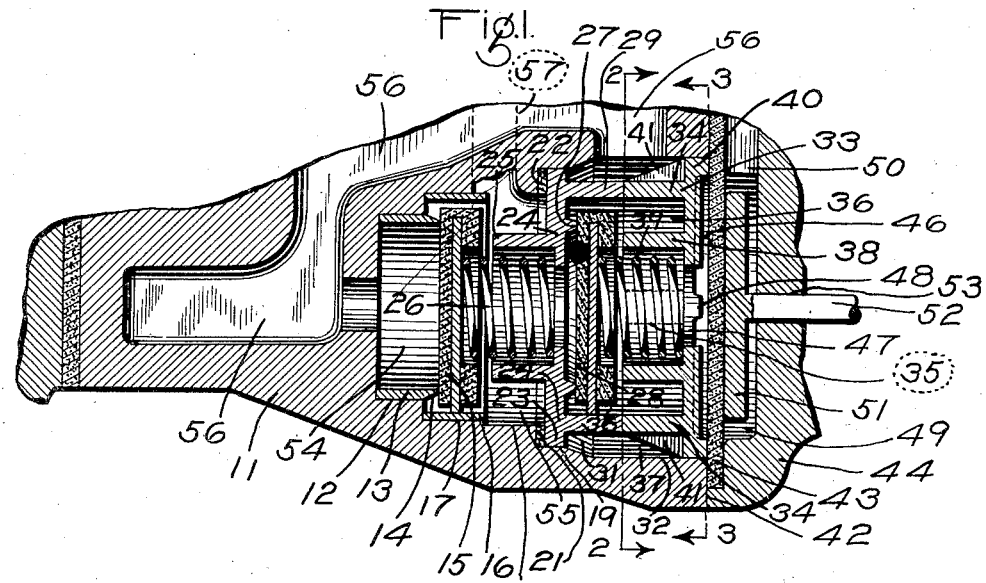
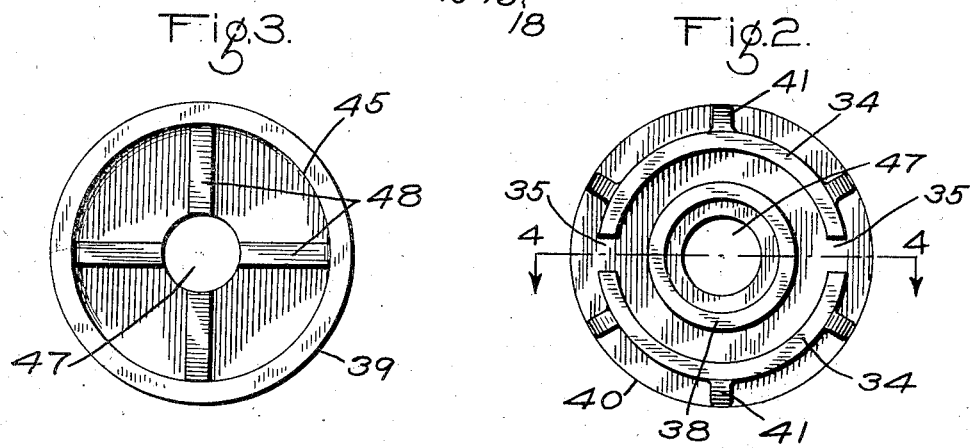
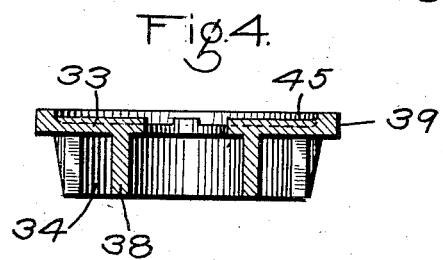
INVENTOR.
CLYDE C. FARMER
By *Wm. M. Cady*
ATTORNEY.

Patented July 16, 1935

2,008,133

UNITED STATES PATENT OFFICE 2,008,133

CHECK VALVE DEVICE

Clyde C. Farmer, Pittsburgh, Pa., assignor to The Westinghouse Air Brake Company, Wilmerding, Pa., a corporation of Pennsylvania Application May 25, 1932, Serial No. 613,445

6 Claims. (Cl. 251—144)

This invention relates to fluid brake equipment and particularly to check valve devices such as are employed in fluid brake controlling valve devices.

An object of the invention is to provide a multiple check valve device that may be assembled within a single chamber and wherein the superimposed parts of the structure may be successively inserted within the chamber without interference with other parts of the control valve device, and wherein the parts may be successively removed through a single opening in the valve casing for the purpose of inspection and repair.

A further object of the invention is to provide a combined check valve and movable abutment device wherein parts of the check valve mechanism are utilized to support the movable abutment and wherein the check valve devices are retained in assembled position by the movable abutment and the cover for said abutment.

A further object of the invention is to provide a combined check valve and movable abutment device having the above noted characteristics wherein a check valve seat and the retainer therefor are provided with centering facilities for assisting in the proper assembly of the parts, and wherein the diaphragm of the movable abutment device is so supported by the valve seat retainer that a relatively large effective area of the diaphragm is subjected to fluid pressure within the valve chamber when the diaphragm is resting upon said retainer.

A further object of the invention is to provide a combined multiple check valve and movable abutment device wherein certain of the parts thereof serve multiple duty, thereby reducing the number of parts required to a minimum, and wherein the parts are simple and relatively inexpensive and may readily be assembled and retained in operative position by a single cover member.

These and other objects of the invention that will be made apparent throughout the further description thereof are attained by means of the valve mechanism hereinafter described and illustrated in the accompanying drawing; wherein Fig. 1 is a longitudinal section through a combined multiple check valve device and movable abutment device embodying features of the invention;

Fig. 2 is a plan view of the retainer shown in Fig. 1, viewed in the direction of the arrows 2—2;

Fig. 3 is a plan view of the retainer viewed in the direction of the arrows 3—3; and Fig. 4 is a longitudinal section through the retainer taken on the line 4—4 of Fig. 3.

Referring to the drawing, the valve structure illustrated is of the type similar to that disclosed in the copending application of Clyde C. Farmer for Fluid pressure brakes, Serial No. 612,465, filed May 20th, 1932, and assigned to the assignee of this application, and as the functions of the valve structure herein disclosed are fully set forth in that application, and this application relates to the structural features of the valve device, the functions will be but briefly referred to herein.

Referring to the drawing, the valve structure comprises a casing 11, having a chamber or bore therein which constitutes a part of a fluid passage or passages and which may be divided into a series of chambers as will hereinafter appear.

Beginning with the bore 12 constituting the inner portion of the chamber, a cylindrical tube 13 is inserted therein for providing a valve seat 14 upon which a disc valve 15 is seated. A cylindrical bushing 16 is inserted in the adjacent bore 17, next larger in diameter, and this bushing serves as a guide for the valve 15. The next adjacent bore 18 is made slightly larger in diameter and the bore 17, in order to permit the bushing 16 to pass freely through it during assembly. The next larger bore 19 provides a shoulder 21 between the bores 18 and 19 for receiving a gasket 22 and flange 23 of a valve seat member 24 which closely fits within the bore 19.

The valve seat member 24 is provided on its inner side with a cylindrical flange 25 which extends toward the valve 15 and which serves to limit movement of the valve 15 away from the valve seat 14 and to center a spring 26 interposed between and engaging the valve 15 and the valve seat member 24 for urging the valve into engagement with the valve seat 14.

The outer side of the valve seat member 24 is provided with a seat rib or valve seat 27 upon which a valve disc 28 is seated, the valve being guided in a cylindrical flange 29 projecting from the outer face of the valve seat member.

The outer end of the bore 19 is chamfered at 31 so that it merges into the next larger bore 32 and provides an inclined surface which serves to guide the valve seat member 24 into proper position wherein it is centered in the bore 19 as shown in Fig. 1, and engages the gasket 22.

The valve seat member 24 is held in the operative position shown, by a retainer 33 having on its inner face a pair of semi-circular flanges 34 that are aligned with and engage the cylindrical flange 29 of the valve seat member 24, so as to prevent outward movement thereof. The flanges 34 are separated to provide spaces 35 through which fluid may flow from the inner valve chamber 36 formed by the flanges 29 and 34, to the outer annular chamber 37.

The inner face of the retainer is also provided with a cylindrical projection 38 which serves to center a spring 39 that is interposed between and engages the valve 28 and the retainer 33, and which serves to urge the valve 28 into engagement with the valve seat 27. The projection 38 also serves to limit movement of the valve 28 from its seat.

The retainer 33 is provided with a flange 40 that closely fits into the bore 32, and with guide webs 41 on the outer face of the flanges 34 sloping inwardly from the periphery of the flange 40 to the edges of the flanges 34, which are adapted to engage the casing wall at the mouth of the bore 32 and guide the retainer into the assembled position shown, thereby facilitating the assembly of the valve device.

The outer face of the flange 40 is flush with the face 42 of the casing 11 and is engaged by a flexible diaphragm 43 that also serves as a sealing gasket between the casing and a cover 44, and which is clamped between the casing and the cover when the latter is secured to the casing by means of bolts or screws (not shown).

The outer face of the retainer is provided with a recess 45, which provides a chamber 46 between the retainer and the diaphragm that receives fluid under pressure from the valve chamber 36 through a central opening 47. The inner face of the diaphragm is, therefore, subject to fluid pressure upon substaintially all of its exposed area and the outer face of the retainer is provided with radial ribs 48, which serve to support the major portion of the diaphragm surface out of contact with the retainer when the diaphragm is subjected to a higher fluid pressure on its outer face than the pressure on the inner face thereof. By reason of this construction, substantially the entire inner face of the diaphragm is subjected to fluid pressure within the chamber 46.

The outer face of the diaphragm is subject to the fluid pressure within a chamber 49 between the diaphragm and the cover 44 and a follower 51 is secured to the outer face of the diaphragm and which may serve to operate valve mechanism (not shown) through the medium of a stem 52 which extends exteriorly of the cover through a bore 53 therein.

By reason of the valve mechanism inserted in the chamber as above described, the chamber is divided into a chamber 54 on the inner side of the valve 15 and chamber 55 on the outer side of the valve 15 which serves to close communication between said sub-chambers; a valve chamber 36 on the outer side of the valve seat member in which the valve 28 is mounted, said valve serving to close communication between the chambers 55 and 36; a chamber 46 which communicates with the valve chamber 36 through opening 47, and an annular chamber 37 surrounding the valve chamber 36 and which communicates with that chamber through the openings 35 between the flanges 34 of the retainer 33. The diaphragm chamber 49 is provided in the cover 44.

From the foregoing description, it is apparent that the parts of the valve device disclosed may be successively placed in their respective operative positions, beginning with the insertion of the valve seat bushing 13 and ending with the securing of the closure or cover 44 upon the casing 11 by bolts (not shown), and that the assembly is facilitated by the inclined guides provided for guiding the valve seat member and the retainer to their operative positions. It will be further noted that all of the parts are retained in their operative positions shown by the cover and that the parts are readily accessible for successive removal when the cover is removed.

By clamping the valve seat members and the retainer between the yielding gasket 22 and the yielding diaphragm 43, the parts are securely retained in place regardless of any slight discrepancies in over-all dimensions incident to manufacture.

In the particular valve device disclosed herein, for the above mentioned purpose, chambers 54 and 37 are connected by a passage 56 leading to the triple valve piston chamber (not shown) and the chamber 55 is provided with a passage 57 leading from the strainer chamber (not shown) of the triple valve device that is connected to the brake pipe (not shown). The chamber 49 is connected to an auxiliary reservoir (not shown) by a passage 50.

The valve structure disclosed is particularly adapted for use in the brake controlling valve device referred to above and disclosed in said copending application, and the check valves are so arranged that when the pressure in the chamber 55 is increased a predetermined amount above that in the chamber 36, the valve 28 is forced open by the higher pressure on the left face thereof, and fluid may then flow past the valve 28 from chamber 55 to chamber 36 and thence through passages 35, and chamber 37 to the passage 56.

When the pressure in chamber 55 is reduced a predetermined amount below that in passage 56 and chamber 54, the higher pressure on the left face of the valve 15 forces the valve open and fluid may then flow from the chamber 54 past the valve 15 to chamber 55 and from thence to passage 57.

When the pressure is increased in the chambers 36 and 46 above the pressure in chamber 49, the diaphragm 43 is flexed outwardly, causing movement of the follower 51 and stem 52, which may actuate a release insuring valve or other valve mechanism (not shown).

While I have disclosed the valve structure as particularly applied for controlling a by-pass around a brake pipe fluid strainer in a triple valve device, it is obvious that the construction of the valve and movable abutment may be modified for use in other fluid pressure apparatus and that the chambers controlled by the valves may be connected to various reservoirs and devices for obtaining other effects without departing from the spirit of the invention.

Having now described my invention, what I claim as new and desire to secure by Letters Patent, is:

1. The combination with a casing having a chamber through which fluid under pressure is adapted to flow, and a valve seat member mounted in said chamber and having a valve seat, of a closure for said chamber constituting a flexible diaphragm subject to fluid pressure within said chamber, a valve movable into engagement with said seat and a retaining member mounted in said chamber for retaining said seat member and supporting the movable portion of said diaphragm, said retaining member having projections upon its diaphragm supporting face for maintaining a relatively large proportion of the diaphragm out of contact with said retaining member.

2. The combination with a casing having a chamber through which fluid under pressure is adapted to flow, and a valve seat member mounted in said chamber and having a valve seat, of a closure for said chamber constituting a flexible diaphragm subject to fluid pressure within said chamber, a valve movable into engagement with said seat, and a retaining member mounted in said chamber for retaining said seat member and supporting the movable portion of said diaphragm, said retaining member having radial ridges upon its diaphragm supporting face for maintaining a relatively large proportion of the diaphragm out of contact with said retaining member.

3. The combination with a casing having a chamber through which fluid under pressure is adapted to flow, and a valve seat member mounted in said chamber having a valve seat, of a closure for said chamber constituting a flexible diaphragm subject to fluid pressure within said chamber, a valve movable into engagement with said seat, a retaining member mounted in said chamber, between and engaging said valve seat member and said diaphragm, for retaining said valve seat member in operative position and for supporting said diaphragm, and means between said diaphragm and said retaining member for maintaining a relatively large proportion of the diaphragm out of contact with said retaining member.

4. The combination with a casing having a chamber through which fluid under pressure is adapted to flow, and a valve seat member mounted in said chamber having a valve seat, of a closure for said chamber constituting a flexible diaphragm subject to fluid pressure within said chamber, a valve movable into engagement with said seat, a retaining member mounted in said chamber, between and engaging said valve seat member and said diaphragm, for retaining said valve seat member in operative position and for supporting said diaphragm, means between said diaphragm and said retaining member for maintaining a relatively large proportion of the diaphragm out of contact with said retaining member, and a spring interposed between and engaging said valve and said retaining member for urging said valve into engagement with said seat.

5. The combination with a casing having a chamber through which fluid under pressure is adapted to flow, and a valve seat member mounted in said chamber having a valve seat, of a closure for said chamber constituting a flexible diaphragm subject to fluid pressure within said chamber, a valve movable into engagement with said seat, a retaining member mounted in said chamber, between and engaging said valve seat member and said diaphragm, for retaining said valve seat member in operative position and for supporting said diaphragm, means between said diaphragm and said member for maintaining a relatively large proportion of the diaphragm out of contact with said retaining member, and means on said retaining member for limiting movement of said valve away from said seat.

6. The combination with a casing having a chamber through which fluid under pressure is adapted to flow, and a valve seat member mounted in said chamber having a valve seat, of a closure for said chamber constituting a flexible phragm subject to fluid pressure within said chamber, a valve movable into engagement with said seat, a retaining member mounted in said chamber, between and engaging said valve seat member and said diaphragm, for retaining said valve seat member in operative position and for supporting said diaphragm, means between said diaphragm and said retaining member for maintaining a relatively large proportion of the diaphragm out of contact with said retaining member, a spring interposed between and engaging said valve and said retaining member for urging said valve into engagement with said seat, and means on said retaining member for centering said spring and for limiting movement of said valve away from said seat.

CLYDE C. FARMER.